(12) United States Patent
Steel et al.

(10) Patent No.: US 7,992,759 B2
(45) Date of Patent: Aug. 9, 2011

(54) TWO SPIRAL STEPPED FRICTION STIR WELDING TOOL

(75) Inventors: Russell J. Steel, Salem, UT (US); Scott M. Packer, Alpine, UT (US)

(73) Assignee: Megastir Technologies, LLC, Provo, UT (US)

(*) Notice: Subject to any disclaimer, the term of this patent is extended or adjusted under 35 U.S.C. 154(b) by 318 days.

(21) Appl. No.: 11/452,097

(22) Filed: Jun. 12, 2006

(65) Prior Publication Data

US 2006/0289608 A1    Dec. 28, 2006

Related U.S. Application Data

(60) Provisional application No. 60/689,281, filed on Jun. 10, 2005.

(51) Int. Cl.
*B23K 20/12* (2006.01)

(52) U.S. Cl. ......................................................... 228/2.1

(58) Field of Classification Search ........................ None
See application file for complete search history.

(56) References Cited

U.S. PATENT DOCUMENTS

| | | | |
|---|---|---|---|
| 5,711,702 A | | 1/1998 | Devlin |
| 6,648,206 B2* | | 11/2003 | Nelson et al. ............... 228/112.1 |
| 6,669,075 B2* | | 12/2003 | Colligan ........................ 228/2.3 |
| 6,676,008 B1* | | 1/2004 | Trapp et al. ................ 228/112.1 |
| 6,783,055 B2* | | 8/2004 | Ezumi et al. ............... 228/112.1 |
| 6,915,939 B2* | | 7/2005 | Hashimoto et al. ........... 228/2.1 |
| 6,994,242 B2* | | 2/2006 | Fuller et al. ................ 228/112.1 |
| 7,234,626 B2* | | 6/2007 | Trapp et al. ................ 228/112.1 |
| 7,270,257 B2* | | 9/2007 | Steel et al. ..................... 228/2.1 |
| 7,383,975 B2* | | 6/2008 | Stol et al. ....................... 228/2.1 |
| 7,401,723 B2* | | 7/2008 | Stol et al. ....................... 228/2.1 |
| 2004/0108359 A1 | | 6/2004 | Hashimoto et al. |
| 2005/0121497 A1* | | 6/2005 | Fuller et al. ................ 228/112.1 |
| 2006/0175382 A1* | | 8/2006 | Packer et al. .............. 228/112.1 |
| 2007/0057015 A1 | | 3/2007 | Colligan |
| 2008/0048005 A1* | | 2/2008 | Forrest et al. ................. 228/101 |
| 2008/0135405 A1* | | 6/2008 | Hori et al. ................. 204/298.12 |

FOREIGN PATENT DOCUMENTS

GB        2306366 A   * 5/1997
JP       2007301579 A  * 11/2007

* cited by examiner

*Primary Examiner* — Kiley Stoner
*Assistant Examiner* — Carlos Gamino
(74) *Attorney, Agent, or Firm* — Morriss O'Bryant Compagni, P.C.

(57) ABSTRACT

A method of selecting a geometry for a friction stirring tool, said tool having a melting point that is higher than the workpiece material, wherein the tool is placed in motion against the workpiece to generate heat in the workpiece such that workpiece material is transported in surface features of the tool, and wherein surface features manage workpiece material flow around the tool, and wherein the tool can be used in friction stir processing, friction stir mixing, friction stir welding, and friction stir spot welding of high melting temperature materials or high softening temperature materials.

3 Claims, 4 Drawing Sheets

TWO SPIRAL STEPPED FRICTION STIR WELDING TOOL

CROSS REFERENCE TO RELATED APPLICATIONS

This document claims priority to, and incorporated by reference all of the subject matter included in the provisional patent application, having Ser. No. 60/689,281 and filed on Jun. 10, 2005.

BACKGROUND OF THE INVENTION

1. Field of the Invention

This invention relates generally to solid state processing of high softening temperature materials (HSTM) through friction stirring (FS), including friction stir processing (FSP), friction stir mixing (FSM), friction stir welding (FSW), and friction stir spot welding (FSSW). The invention relates more specifically to selecting the geometry of the friction stirring tool that is used to perform all of the friction processes named above. This document will refer to specific processes, but all of the above named friction processes should be considered to be within the scope of whatever process is specifically being discussed.

2. Description of Related Art

The prior art teaches numerous tool geometries and configurations for friction stir welding of low softening temperature materials (LSTM) such as aluminum alloys. These tool geometries are exclusively for LSTM applications because tool materials and geometries had not yet been discovered to join or process high softening temperature materials (HSTM) such as steel, stainless steel, and nickel base alloys.

While designed for HSTM applications, it should be stated that some of the tool geometries disclosed in this document are functional for friction stirring of aluminum alloys (i.e. scrolls on concave and convex shoulders, threads on pins, etc.). However, some of the geometries are not technically feasible because the strength of the tool material is exceeded during solid state processing. These geometries include fins that resemble air foils that extend radially from the tip of the pin.

A careful review of FSW tool geometries used in current art for LSTM is based on tool geometries that have been successful through trial and error attempts using a variety of FSW parameters (i.e. tool rotational speed, Z axis loading, and tool travel speed). Subsequent publications and patent applications have disclosed variations of these tool geometries, some of which have not been tested and are not feasible for these LSTMs.

There are also ongoing programs established to develop computer models of the FSW process. The purpose of these computer models is to predict and develop tool geometries that can provide consolidated friction stir welds with favorable microstructures at optimum tool travel and rotational speeds. To this point in time, millions of dollars have been spent and there has not been a successful model that can predict tool geometries for FSW of LSTM. FSW and friction stir processing (FSP) of HSTM has been performed at Brigham Young University. Limited modeling of FSW and FSP has been completed under DARPA research contracts. Successful computer models have not yet been developed because of the complexity of the FSW process and extensive validation testing that must be correlated with actual FSW tool geometries and FSW/FSP specimens.

These experiments have demonstrated that there are two predominant problems with the existing art. First, tool geometries are developed using a trial and error approach. Second, tool geometries for LSTM are very often different than tool geometries required for HSTM. Even though some geometries appear similar for both HSTM and LSTM, there are key differences that must be accounted for in the HSTM design.

The trial and error approach which has been adopted for FSW and FSP of LSTM has prevented an understanding of process fundamentals and tool design principles. This approach has been tolerable since the cost of tool fabrication is minimal and limited to the cost of tool steel, machining, and heat treatment. A tool design can be readily made and tested to determine if the desired microstructure and mechanical properties have been achieved. Since costs are minimal, most tool geometries are developed in this fashion. This approach is based on observation and luck and does not explain the mechanism of FSW as it relates to LSTM. The scientific and engineering fundamentals of tool design have been largely overlooked and are only partially understood.

A second problem that is not understood by those attempting tool design is that tool geometries for HSTM are generally unsuitable for use in LSTM. For example, a threaded pin design is an acceptable pin design for LSTM such as aluminum alloys. When this same tool design is made to friction stir weld steel, the threads from the pin remain engaged in the steel and the pin will break from the tool as the tool is extracted.

Because most LSTM consist of aluminum alloys, tool geometries reflect the trial and error design approach that has been successful in these alloys. However, there are at least three important fundamental differences in the design of tools for FSW/FSP for HSTM and LSTM. First, the thermal conductivity of the most common LSTM materials (aluminum and copper) is greater than that of the tool (typically tool steel).

In contrast, the thermal conductivity of the HSTM materials is generally significantly lower than that of the tools used in the welding. A second fundamental difference is in the coefficient of friction between the tool and the workpiece. For LSTM, the coefficient of friction is high, while it is low for HSTM. This factor significantly changes the heat generation of the process, which has important considerations for tool design. The third difference is in the primary objective of a successful process. In most LSTM, the objective is to minimize the heat input to preserve the optimal microstructure, which leads to high operating forces.

In contrast, the primary objective in HSTM is to soften the material sufficiently to achieve full consolidation, which is a significant obstacle to successful friction stirring of HSTM. These three differences are generally going to require fundamental differences in tool design for most HSTM.

It is noted for the purposes of this document that HSTM should be considered to include materials such as metal matrix composites, ferrous alloys such as steel and stainless steel, and non-ferrous materials and superalloys. Superalloys can be materials having a higher melting temperature than bronze or aluminum, and may have other elements mixed in as well. Some examples of superalloys are nickel, iron-nickel, and cobalt-based alloys generally used at temperatures above 1000 degrees F. Additional elements commonly found in superalloys include, but are not limited to, chromium, molybdenum, tungsten, aluminum, titanium, niobium, tantalum, and rhenium. Titanium should also be considered to be within the class of materials being considered. Titanium is a non-ferrous material, but has a higher melting point than other nonferrous materials.

It should also be understood that solid state processing is defined herein as a temporary transformation into a plasticized state that typically does not include a liquid phase. However, it is noted that some embodiments allow one or more elements to pass through a liquid phase, and still obtain the benefits of the present invention. Solid state processing should also be considered as a term that describes the plasticization of the HSTM during friction stirring (FS), friction stir processing (FSP), friction stir mixing (FSM), friction stir welding (FSW), and friction stir spot welding (FSSW).

The tool being used for solid state processing as defined herein can be assumed to be comprised of a shank or shaft, a shoulder on the shank, and a pin disposed on the shoulder. In an alternative embodiment, the tool has no shoulder, but is a conical pin having any of the features to be described herein.

BRIEF SUMMARY OF THE INVENTION

The present invention is a method of selecting a geometry for a friction stirring tool, said tool having a melting point that is higher than the workpiece material, wherein the tool is placed in motion against the workpiece to generate heat in the workpiece such that workpiece material is transported in surface features of the tool, and wherein surface features manage workpiece material flow around the tool, and wherein the tool can be used in friction stir processing, friction stir mixing, friction stir welding, and friction stir spot welding of high melting temperature materials or high softening temperature materials.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Tools designed for friction stirring (and thus all of the friction processes including FSP, FSW, FSM, and FSSW) of HSTM are quite expensive due to high costs of exotic raw materials and extensive finishing operations. These costs make it expensive and impractical to take a trial and error approach to tool design. A systematic methodology using finite element analysis and design of experiments was developed to determine design criteria for tool geometries to be used in processing of HSTM.

Figure 1:
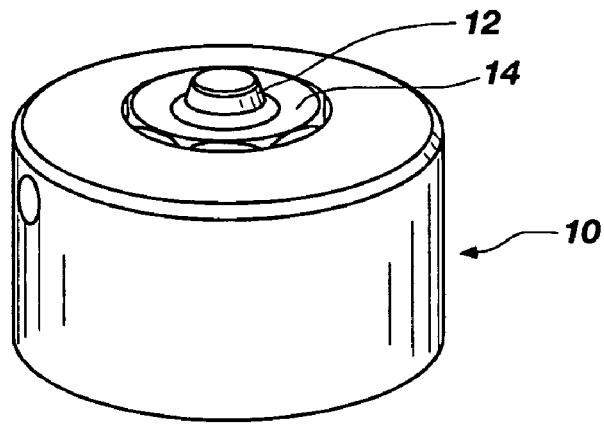
FIG. 1 is an illustration of a tool from the prior art that has no surface features on the pin or shoulder.
Figure 2:
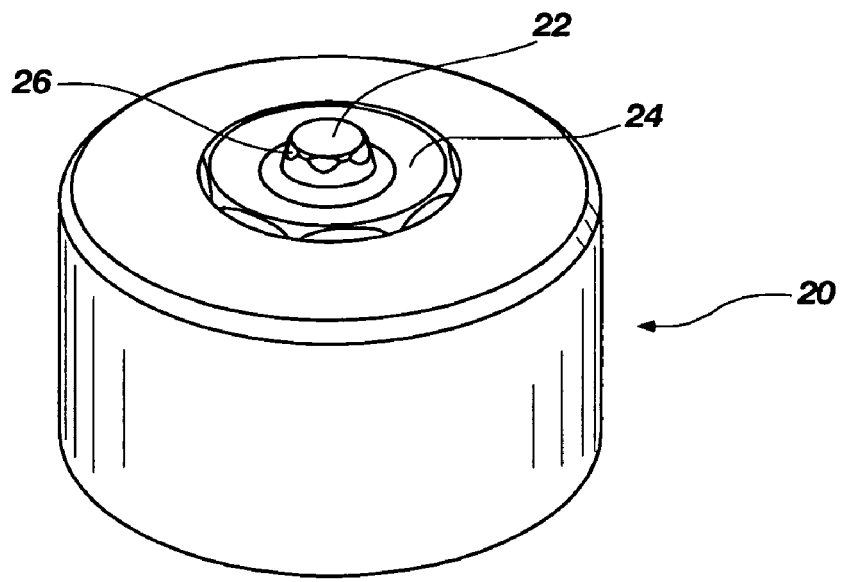
FIG. 2 is an illustration of a tool from the prior art wherein the pin has a plurality of flats disposed at angles on the pin.

Beginning with a known tool geometry from the prior art that is without features as shown in FIG. 1 was made and tested on X65 pipeline steel to understand loads and process conditions. It was determined that without surface features on the PCBN tool/workpiece material interface, that process loads were significantly higher and tool travel speeds were significantly lower than identical tools with surface features. FIG. 1 is a tool 10 having a pin 12 and a shoulder 14. FIG. 2 shows a tool 20 having a pin 22, a shoulder 24, and a plurality of flats 26 on a working end of the pin.

A series of experiments was developed using other successful HSTM tool designs and new designs developed from computer modeling. Many designs required the development of new tool manufacturing methods, jigs, fixtures, equipment and procedures because the materials used (PCBN, refractory alloys and intermetallics, etc.) for HSTM friction stirring cannot be conventionally machined in contrast to FSW tools for LSTM being made from tool steels.

The results of this multi-year development program have determined that tool designs for friction stirring of HSTM can readily and successfully be developed without a trial and error approach using the following design criteria:

First, the tool material must have a melting point greater than the workpiece material. In some experiments, the tool material had a melting temperature that was 25% greater than the melting temperature of the workpiece material. However, such a large difference is melting temperature is not required, but is useful in some circumstances.

Second, heat generation during the process is an important factor in reducing flow stresses, reducing tool loads and maximizing tool travel speed for any given HSTM. Because of the low coefficient of friction in these tool materials, tools with smooth surface features generally produce less frictional heat than those with surface features designed to mechanically capture and transport workpiece material.

Third, when surface features are used to mechanically capture workpiece material, the primary heat-generation location moves away from the tool-workpiece interface into the material deformation zone. This move away from the interface into the workpiece material is important because of the high thermal conductivity of the tool.

Fourth, surface features must adequately capture and transport workpiece material so it is not displaced away from the tool. A steady state control volume around the tool is necessary to transport, heat, soften and flow material around the tool.

Fifth, the surface features referred to in paragraphs [0035] and [0036] must have special characteristics when used for HSTM. The tool must have no reentrant features when examined in a direction parallel to the tool axis. Thus, traditional threads or spiral grooves cannot be used in HSTM tools.

Finally, the surface features on the tool must be designed so that stress risers are not formed in tensile stress regions of the tool. Stress risers form crack initiation sites that can cause tool fatigue failure.

Figure 3:
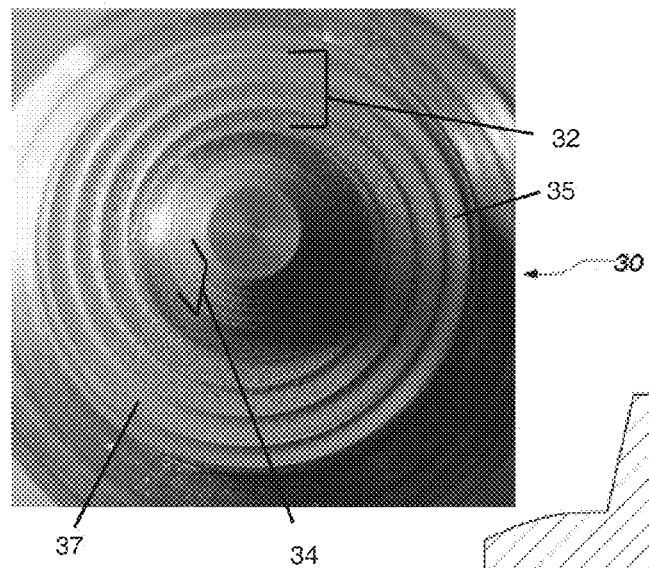
FIG. 3 is a top view illustration of a stepped spiral shoulder and a stepped spiral pin.

When the tool used is created according to these design criteria, the tool can be run in a position normal to the workpiece surface. This allows for optimal tool/workpiece surface area contact. FIG. 3 shows an example of a tool 30 from above having a stepped spiral shoulder 32 and a stepped spiral pin 34 that is run in a position normal to the X65 workpiece. The X and Z axis loads were reduced by approximately 40% over a tool geometry that had a concave shoulder with no surface features. Tool travel speeds were increased by over 75%.

There are several tool designs using the above design criteria that can be employed to successfully friction stir HSTM. Only a few specific designs are illustrated herein.

Figure 4:
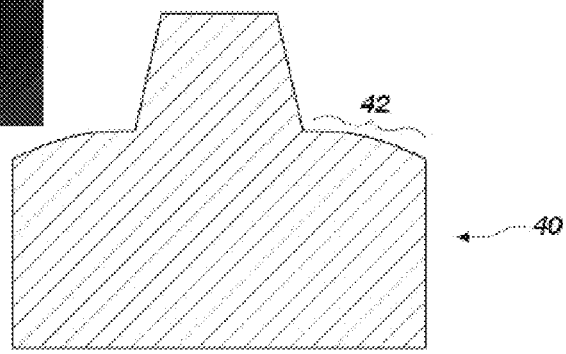
FIG. 4 illustrates in a cutaway view a shoulder of an FSW tool with a nonlinear profile.

FIG. 4 illustrates a in a cutaway view a shoulder 42 of an FSW tool 40 with a nonlinear profile.

Figure 5:
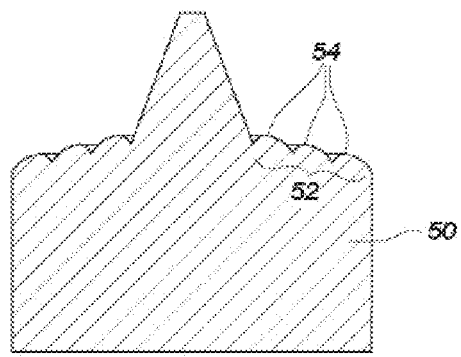
FIG. 5 is a cutaway profile view that illustrates a curved section having concave steps.

FIG. 5 is a cutaway profile view that illustrates a tool 50 having a shoulder 52 with concave steps 54 that are curved.

Figure 6:
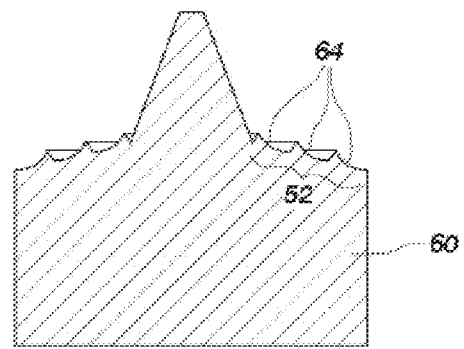
FIG. 6 is a cutaway profile view that illustrates a curved section having convex steps.

FIG. 6 is a cutaway profile view that illustrates a tool 60 having a shoulder 62 with convex steps 64 that are curved.

Figure 7:
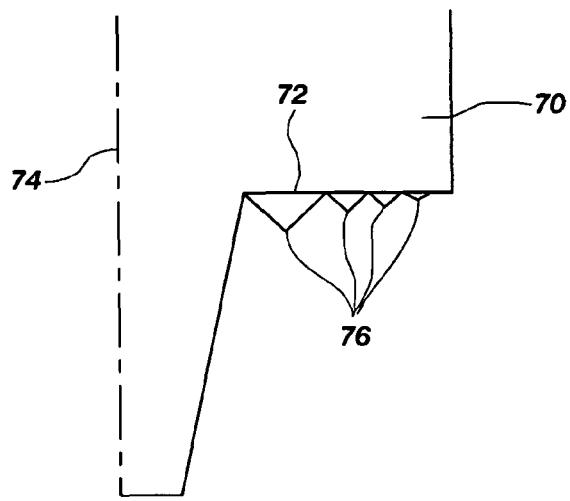
FIG. 7 is a cutaway profile view that illustrates a shoulder normal to the tool axis, having protruding features of variable height.

FIG. 7 is a cutaway profile view that illustrates one half of a tool 70 having a shoulder 72 normal to a tool axis 74, having protruding features 76 of variable height.

Figure 8:
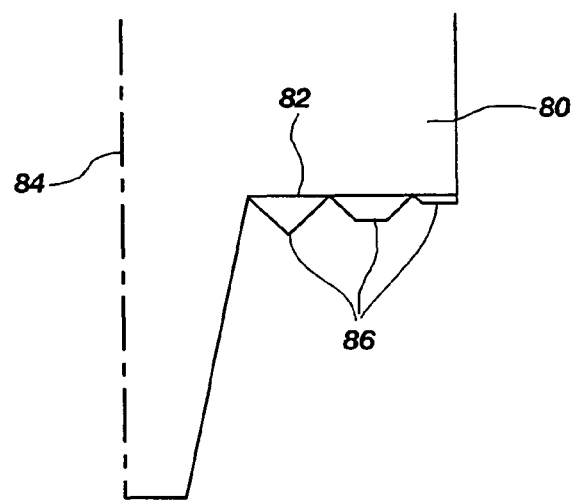
FIG. 8 is a cutaway profile view that illustrates a shoulder normal to the tool axis, and having protruding features of variable heights that have also been modified to have flats.

FIG. 8 is a cutaway profile view that illustrates one half of a tool 80 having a shoulder 82 normal to the tool axis 84, and having protruding features 86 of variable heights that have also been modified to have flats.

Figure 9:
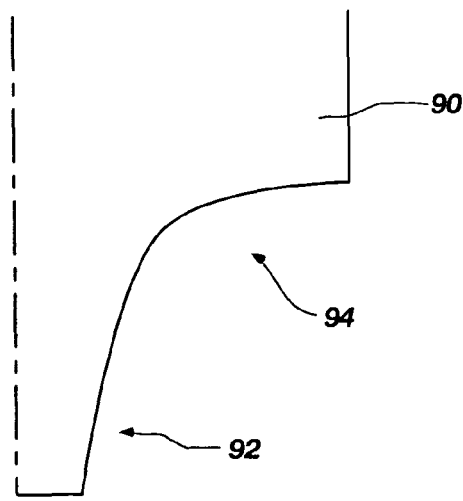
FIG. 9 is a cutaway profile view that illustrates a friction stirring tool having continuous curvature between the pin and the shoulder.

FIG. 9 is a cutaway profile view that illustrates a friction stirring tool 90 having continuous curvature between the pin 92 and the shoulder 94, such that there is no clear delineation between pin and shoulder.

Figure 10:
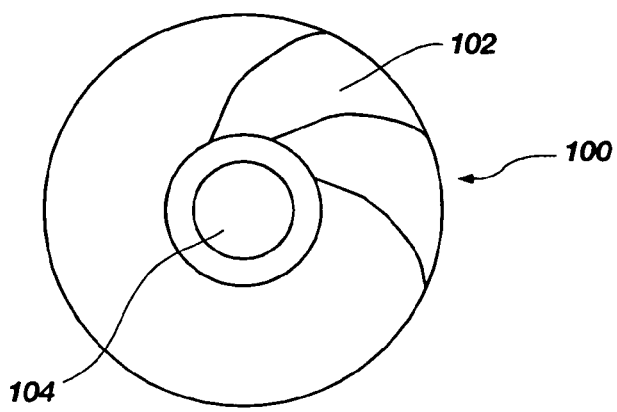
FIG. 10 is a top view of a friction stirring tool with a tapered, convex, or concave shoulder having shoulder features in a substantially radial direction.

FIG. 10 is a top view of a friction stirring tool 100 with pin 104, and having a tapered, convex, or concave shoulder 102 having shoulder features in a substantially radial direction, with said features designed to capture material, generate heat, and constrain material to the pin region.

Figure 11:
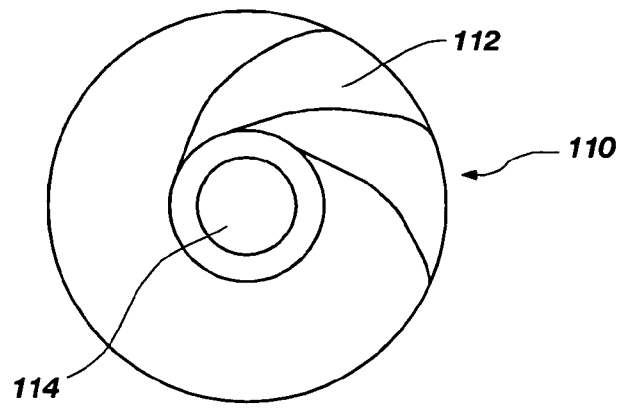
FIG. 11 is a top view of a friction stirring tool with a tapered, convex, or concave shoulder having shoulder features with substantially straight profiles, with the inner end making a tangent with the pin.

FIG. 11 is a top view of a friction stirring tool 110 with pin 114, and having a tapered, convex, or concave shoulder 112 having shoulder features with substantially straight profiles, with the inner end making a tangent with the pin, with said features designed to capture material, generate heat, and constrain material to the pin region.

Figure 12:
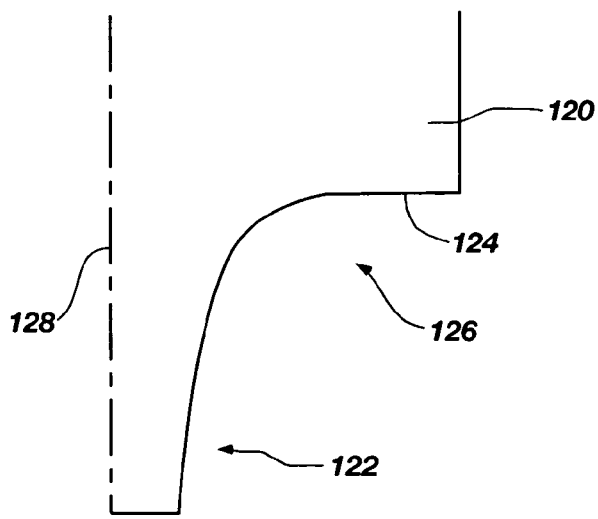
FIG. 12 is a cutaway profile view that illustrates a friction stirring tool forming a continuous curve from a pin down to a surface of the shoulder that is normal to the axis of the tool.

FIG. 12 is a cutaway profile view that illustrates one half of a friction stirring tool 120 forming a continuous curve from a pin 122 down to a surface 124 of the shoulder 126 that is normal to an axis 128 of the tool.

From these figures, several observations can be made. First, surface features include but are not limited to grooves, dimples, convex shoulders, concave shoulders, spiral grooves on the shoulder and or pin, spiral grooves on the end of the pin, and variable pitch spirals.

It is noted that a tool suitable for friction stirring of HSTM may also have a profile that is conical having no shoulder with grooves, spiral grooves, dimples, or other surface features that cause the material to flow around the tool.

One useful embodiment is a tool with a shoulder having multiple tapers and/or non-tapered regions using surface features.

Another embodiment is a friction stirring tool having a non-linear profile from the outside diameter of the shoulder to the pin. This is possible through an arc, series of arcs, or nonlinear curve.

In one embodiment, the tool has one or more "steps" on the surface of the shoulder. In another embodiment, the tool has one or more "grooves" on the surface of the shoulder. These steps can be nonlinear. If these steps are manufactured at an angle not normal to the surface of the shoulder, a step is produce that can be used to draw the material to the center of the shoulder. In another embodiment, a friction stirring tool will have one or more "steps" spiraled from the outside of the shoulder to the pin. The step or steps can be perpendicular to the plane of the pin or a plane other than perpendicular to the pin. From the outside diameter of the pin, the step may be manufactured so as to spiral in the same axis as the protruding pin as it also spirals towards the center of the shoulder and pin. If the step is manufactured at an angle that is not normal to the surface of the shoulder, a protrusion from the face of the shoulder can be formed to provide an auguring effect on the material being joined. In addition, a friction stirring tool may have a shoulder perpendicular or near perpendicular ($0<\theta<1$) to the pin having one or more steps or grooves in the surface of the shoulder.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A tool for solid state processing of high softening temperature materials (HSTM), said tool comprising:
    a cylindrical shank;
    a shoulder disposed on a working end of the shank;
    a pin disposed co-axially on the shoulder;
    a working surface of the tool comprising PCBN; and
    wherein at least one surface feature is disposed on the tool, and comprises at least a first protruding step on a surface of the shoulder that spirals from a first point at an outer portion of the shoulder towards the pin and a second protruding step on the surface of the shoulder that spirals from a second point at the outer portion of the shoulder towards the pin, the first protruding step and the second protruding step in direct contact with one another to thereby form contiguous steps spiraling across the surface of the shoulder and ascending from the shoulder to the pin.

2. The tool as defined in claim 1 wherein the pin is formed with a stepped spiral.

3. The tool as defined in claim 1 wherein the at least a first protruding step on a surface of the shoulder that spirals from an outer portion of the shoulder towards the pin spirals about the same axis as the protruding pin.

* * * * *